US008733950B2

(12) United States Patent
Grötsch et al.

(10) Patent No.: US 8,733,950 B2
(45) Date of Patent: May 27, 2014

(54) LED PROJECTOR

(75) Inventors: Stefan Grötsch, Lengfeld-Bad Abbach (DE); Ewald Karl Michael Günther, Regenstauf (DE); Alexander Wilm, Regensburg (DE); Siegfried Herrmann, Neukirchen (DE)

(73) Assignee: OSRAM Opto Semiconductors GmbH (DE)

( * ) Notice: Subject to any disclaimer, the term of this patent is extended or adjusted under 35 U.S.C. 154(b) by 435 days.

(21) Appl. No.: 13/062,792

(22) PCT Filed: Sep. 9, 2009

(86) PCT No.: PCT/DE2009/001270
§ 371 (c)(1),
(2), (4) Date: Mar. 31, 2011

(87) PCT Pub. No.: WO2010/028637
PCT Pub. Date: Mar. 18, 2010

(65) Prior Publication Data
US 2011/0176116 A1    Jul. 21, 2011

(30) Foreign Application Priority Data

Sep. 11, 2008  (DE) .......................... 10 2008 046 762

(51) Int. Cl.
*G03B 21/26* (2006.01)
*H01J 1/62* (2006.01)
*H01J 63/04* (2006.01)

(52) U.S. Cl.
USPC ............................................. 353/94; 313/500

(58) Field of Classification Search
None
See application file for complete search history.

(56) References Cited

U.S. PATENT DOCUMENTS

| | | | |
|---|---|---|---|
| 5,300,788 A * | 4/1994 | Fan et al. ......................... 257/13 |
| 6,023,373 A | 2/2000 | Inoguchi et al. | |
| 6,330,018 B1 | 12/2001 | Ramanujan et al. | |
| 6,867,549 B2 * | 3/2005 | Cok et al. ................... 315/169.3 |
| 2002/0122019 A1 | 9/2002 | Baba et al. | |
| 2003/0223236 A1 | 12/2003 | Wu | |
| 2004/0070736 A1 * | 4/2004 | Roddy et al. .................... 353/31 |
| 2005/0122487 A1 | 6/2005 | Koyama et al. | |

(Continued)

FOREIGN PATENT DOCUMENTS

| | | |
|---|---|---|
| DE | 199 25 318 C1 | 2/2001 |
| DE | 100 63 200 A1 | 6/2001 |

(Continued)

OTHER PUBLICATIONS

Keuper, M.H. et al., "P-126: Ultra-Compact LED Based Image Projector for Portable Applications," *SID 03 DIGEST*. May 20, 2003. pp. 713-715.

(Continued)

*Primary Examiner* — William C Dowling
*Assistant Examiner* — Ryan Howard
(74) *Attorney, Agent, or Firm* — DLA Piper LLP (US)

(57) ABSTRACT

An LED projector includes a plurality of light sources; and an image generator which includes an arrangement of pixels, each pixel including at least one light source; wherein the LEDs are stacked epi-LEDs which include layers arranged above one another for different colors, or each pixel includes an emission surface and at least two LEDs are arranged adjacent one another in the emission surface.

4 Claims, 6 Drawing Sheets

(56) References Cited

U.S. PATENT DOCUMENTS

| | | |
|---|---|---|
| 2006/0027820 A1 | 2/2006 | Cao |
| 2006/0181542 A1 | 8/2006 | Granger |
| 2008/0211413 A1* | 9/2008 | Nakamura et al. ......... 315/169.1 |
| 2010/0264843 A1 | 10/2010 | Herrmann |

FOREIGN PATENT DOCUMENTS

| | | |
|---|---|---|
| DE | 10 2007 062 042 A1 | 6/2009 |
| DE | 10 2008 008 599 A1 | 6/2009 |
| DE | 10 2008 013 030 A1 | 6/2009 |
| DE | 10 2008 006 757 A1 | 8/2009 |
| DE | 10 2008 014 094 A1 | 9/2009 |
| EP | 1 609 835 A1 | 12/2005 |
| JP | 7-504782 | 5/1995 |
| JP | 8-202288 | 8/1996 |
| JP | 11-503879 | 3/1999 |
| JP | 11-121806 | 4/1999 |
| JP | 11-233827 | 8/1999 |
| JP | 11-337863 | 12/1999 |
| JP | 2002-191055 | 7/2002 |
| JP | 2006-237071 | 9/2006 |
| JP | 2006-317935 | 11/2006 |
| JP | 2006-319149 | 11/2006 |
| JP | 2007-520071 | 7/2007 |
| WO | 93/16491 A1 | 8/1993 |
| WO | 97/23912 A2 | 7/1997 |
| WO | 03/056876 A2 | 7/2003 |
| WO | 2009/143800 A1 | 12/2009 |

OTHER PUBLICATIONS

The Official Action issued by the Japanese Patent Office on Sep. 24, 2013 in corresponding Japanese Application No. 2011-526369.

* cited by examiner

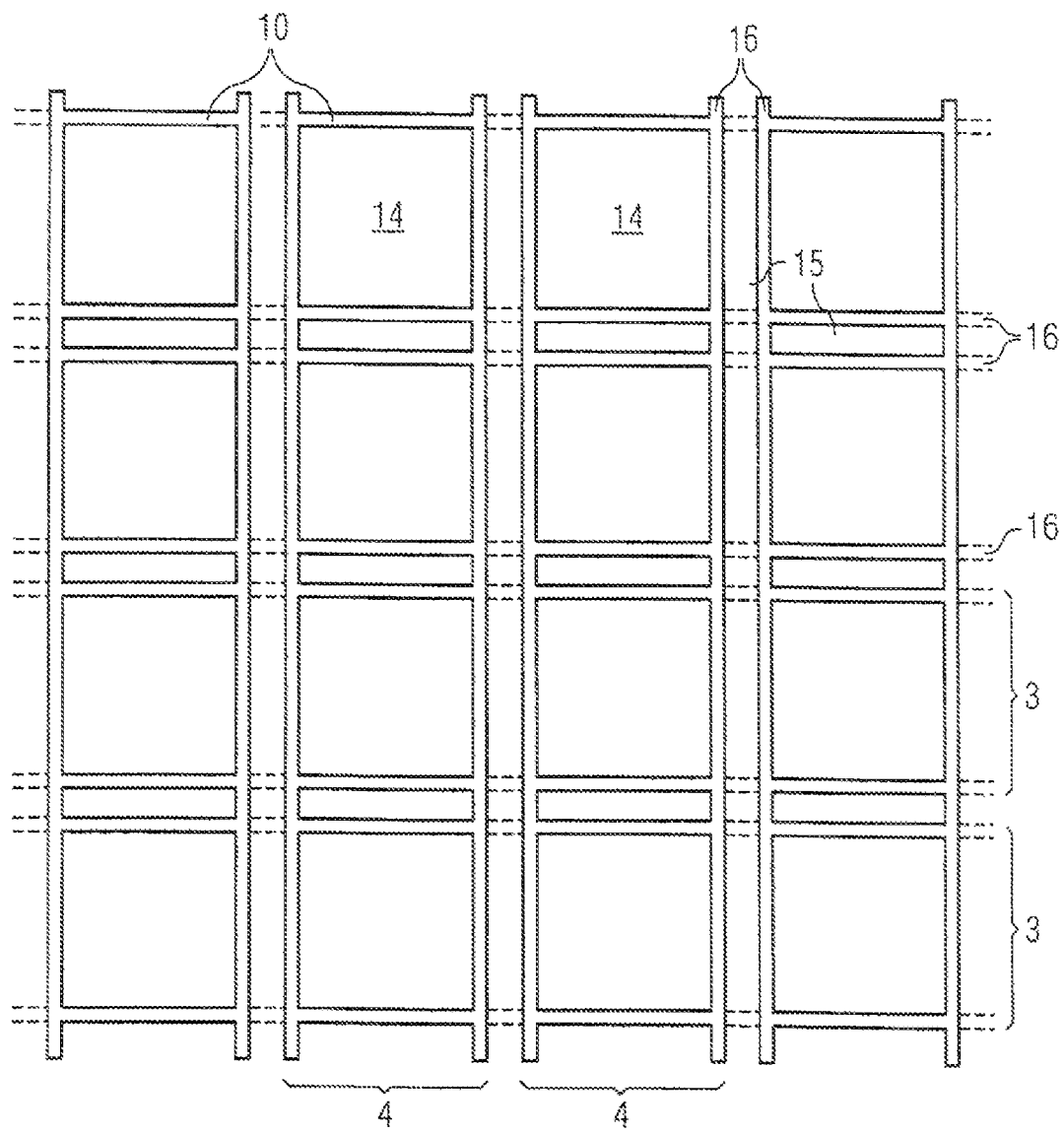

_US 8,733,950 B2_

LED PROJECTOR

RELATED APPLICATIONS

This is a §371 of International Application No. PCT/DE2009/001270, with an international filing date of Sep. 9, 2009 (WO 2010/028637 A1, published Mar. 18, 2010), which is based on German Patent Application No. 10 2008 046 762.6, filed Sep. 11, 2008, the subject matter of which is incorporated by reference.

TECHNICAL FIELD

This disclosure relates to a projection system, the image generator of which comprises an array of light-emitting diodes.

BACKGROUND

Projection systems are usually produced using discharge lamps which have elevated power consumption and a short service life. LED projectors with a significantly longer service life and more efficient mode of operation are also known. Drawbacks of LED projectors are, however, their lower light output due to the light sources they use and losses in the optical system. In conventional projection systems, light emerging from the light source is mixed, homogenized and broken down by a color wheel into the colors red, green and blue. The light of the individual colors is projected onto the image-generating element. Typical image generators are an arrangement of LCDs (liquid crystal displays), LCoS (Liquid Crystal on Silicon) or DLP (Digital Light Processing) with an arrangement of small tiltable mirrors. In polarization-based systems with LCDs or LCoS, only one polarization direction is usable. In systems with DLP, the images are sequentially superimposed such that each light source of a particular color is only switched on with interruptions. In this case too, the light output from the light source is thus not fully utilized.

DE 10 2008 013 030 and DE 10 2008 014 094, for example, describe the basic principles of color mixing and contacting of layer stacks of substrateless diodes. DE 10 2008 008 599, DE 10 2008 006 757 and DE 10 2007 062 042 describe contacting methods for substrateless diodes on or between dielectric interlayers.

DE 199 25 318 C1 describes a color image projector with time-controlled LED light sources. WO 03/056876 A2 describes an illumination system with planar multilayer arrangements of LED light sources. US 2008/0211413 A1 describes a display device produced from LEDs. DE 100 63 200 A1 describes a method and a device with LCD reflective modulators. EP 1 609 835 A1 describes a potting compound for LEDs.

It could therefore be helpful to provide a projection system with a long service life and elevated efficiency despite having a low structural height.

SUMMARY

We provide an LED projector including a plurality of LED light sources; and an image generator which includes an arrangement of pixels, each pixel including at least one light source; wherein the LEDs are stacked epi-LEDs which include layers arranged above one another for different colors, or each pixel includes an emission surface and at least two LEDs are arranged adjacent one another in the emission surface.

BRIEF DESCRIPTION OF THE DRAWINGS

FIG. 9 shows an arrangement of LED chips of an example according to FIG. 8 in plan view.

DETAILED DESCRIPTION

An array of LED chips mounted on a carrier and interconnected is used as the light source. The carrier may preferably be silicon, since both data and power lines may be created in a silicon carrier. Various contacting methods for silicon on printed circuit boards are moreover already known. In color reproduction, a pixel is preferably formed from an arrangement of LED light sources for red, green and blue. In the LED projector, the LEDs are stacked epi-LEDs which comprise layers arranged above one another for different colors, or each pixel of the LED projector comprises an emission surface in which at least two LEDs are in each case arranged adjacent one another. Depending on the chip technology, contacting may be effected solely from the bottom of the carrier or, for example, also partly from the bottom of a silicon carrier and partly from the top by a transparent glass sheet with an electrically conductive, optically transparent coating such as, for example, ITO (indium-tin oxide). The number of pixels and thus also the number of LEDs is determined by the desired resolution of the projector. Particularly high resolution simultaneously combined with small dimensions is achieved with stacked epi-LEDs, in which the layers provided for the different colors are epitaxially grown above one another. A pixel here corresponds to a layer stack of an individual LED, such that all the colors of a respective pixel are emitted from the same emission surface of the LED chip in question.

A more precise description of examples of the LED projector follows below, with reference to the appended Figures.

Figure 1:
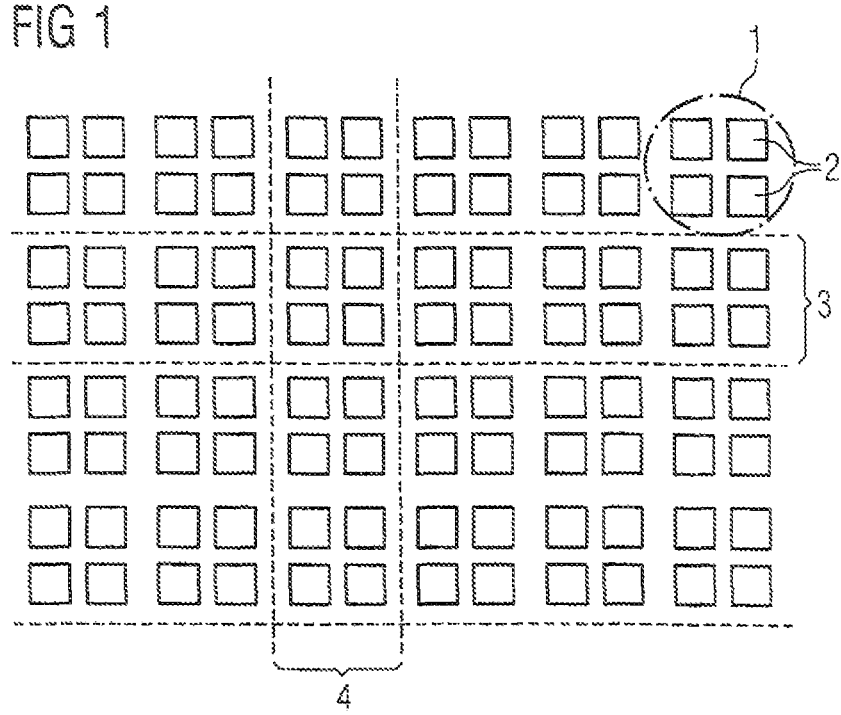
FIG. 1 shows a plan view of an LED array.

FIG. 1 shows a plan view of an example with a grid-like arrangement of pixels 1, each of which comprises an emission surface, in which in each case a plurality of LEDs are arranged adjacent one another, in this Example in each case four LEDs 2. Each LED 2 may be arranged on its own chip. LEDs for red, green and blue light are sufficient for any desired color mixes. In the example shown in FIG. 1, each pixel has four LEDs arranged in a square, two of which are provided for green light. The LED projector may be adapted for different applications, for example, for monochrome images or for polychrome images, with appropriately selected LEDs in the pixels. Addressing a pixel to operate the LED or LEDs arranged therein proceeds by electrical activation of an associated intersection of one conductive track from a plurality of conductive tracks for row addressing and one conductive track from a plurality of conductive tracks for column addressing. In FIG. 1, the dashed lines indicate schematically for one intersection a conductive track 3 for row addressing and a conductive track 4 for column addressing.

The arrangement of the conductive tracks and the contacting so provided of the light-generating layers is not in principle fixed, but may be differently configured depending on the technology involved.

Figure 2:
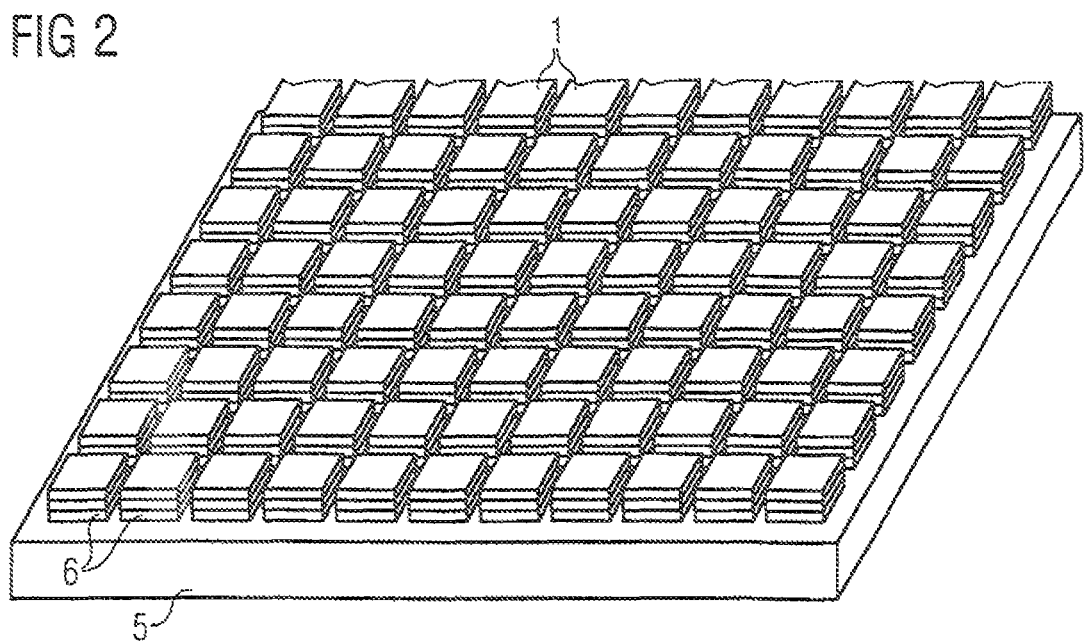
FIG. 2 shows an arrangement of stacked epi-LEDs on a carrier in a perspective view.

FIG. 2 shows a further example in which the layers of LEDs provided for generating light in each pixel 1 are arranged above one another as a layer stack. The LEDs in question may in particular be stacked epi-LEDs in which the layers provided for light generation are epitaxially grown above one another and form a stack. On a carrier 5 is located an array of layer stacks 6, i.e., a plurality of layer stacks 6 arranged in a grid, each layer stack forming a pixel 1. The arrangement with stacked epi-LEDs has the particular advantage that lateral dimensions may be kept small and thus a high projector resolution is achieved. The same emission surface, which is formed by the top of the respective layer stack 6, is used for each color. In this case too, various contacting methods may be considered. The electrical terminals and addressing conductive tracks may be arranged at least in part on top of or completely within the carrier 5.

Figure 3:
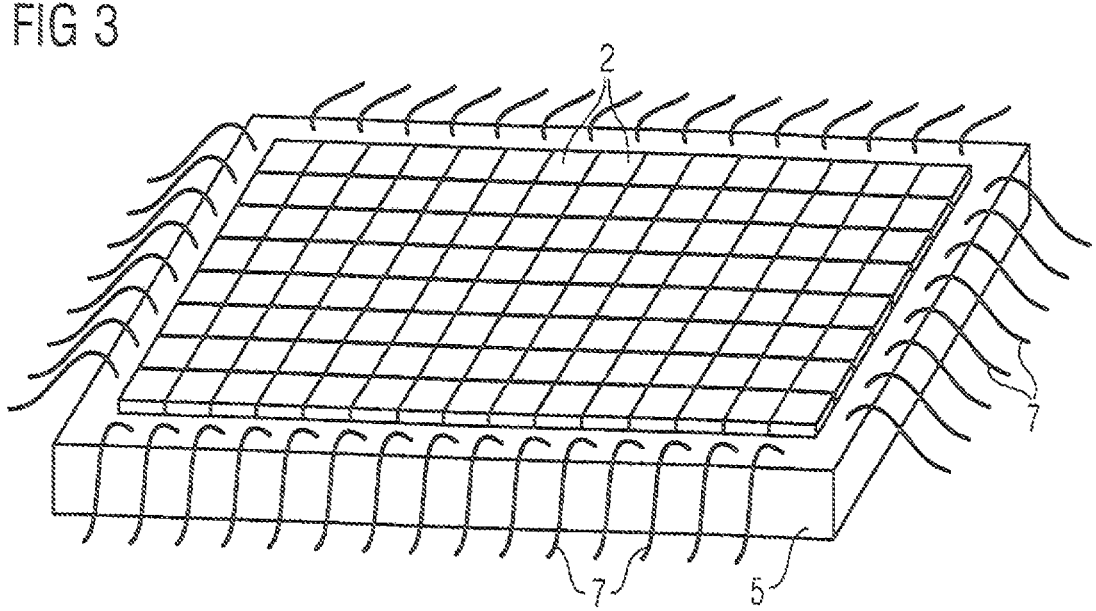
FIG. 3 shows a schematic view according to FIG. 2 of an example with bonding wires.

FIG. 3 shows a further example in which LEDs 2 are arranged on the top of a carrier 5 in a grid of pixels, it being undefined in the schematic diagram of FIG. 3 whether these comprise layer stacks or monochrome LEDs arranged adjacent one another. Bonding wires 7 are present at the edges of the carrier 5 for outward electrical connection, which bonding wires are connected with associated, intersecting conductive tracks for row addressing and column addressing of the LEDs of the array. The conductive tracks are not shown in FIG. 3 since they are concealed by the array of LEDs or are arranged within the carrier 5. The conductive tracks may be arranged on the top of the carrier 5 between the carrier 5 and the LEDs 2 or, in particular in the case of a silicon carrier, may extend within the carrier. Conductive tracks may also be arranged on the top of the LEDs 2 remote from the carrier 5 if a transparent and electrically conductive material, for example, ITO (indium-tin oxide) is used for this purpose.

Figure 4:
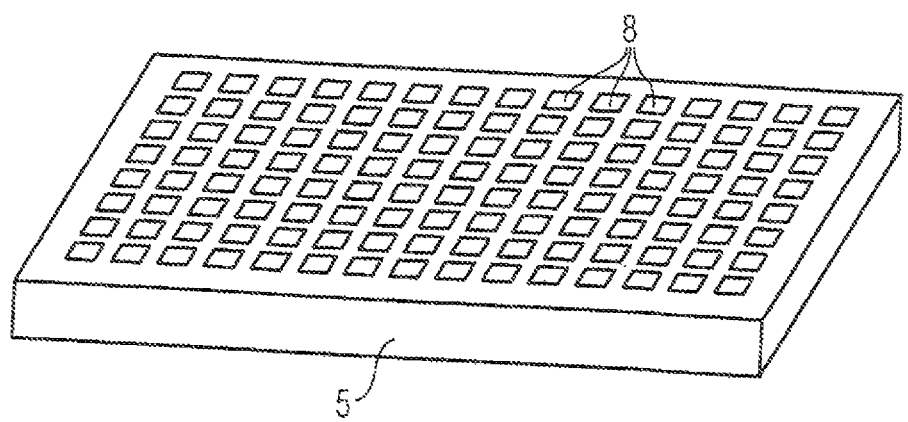
FIG. 4 shows the bottom of an example with terminal contact surfaces on the bottom.

FIG. 4 shows an alternative development in which back surface contacts 8 for electrical connection are provided on the back of the carrier 5. If transparent conductive tracks for electrical connection are present on the front surface, one back surface contact 8 is sufficient for each LED. It is, however, also possible to provide the entirety of the electrical contacting on the back surface of the carrier 5 and, to this end, to arrange in each case two or more back surface contacts 8 for each pixel or for each LED or LED layer.

Figure 5:
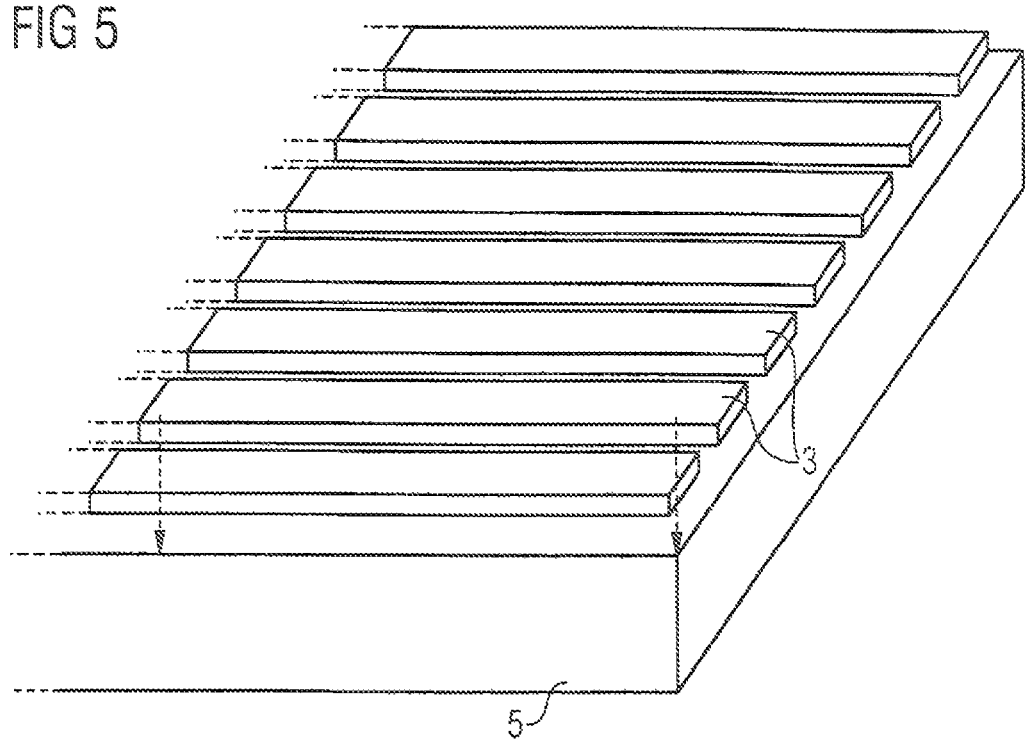
FIG. 5 shows a carrier with conductive tracks for row addressing in a perspective view.

Such a projector may also be constructed by arranging substrateless, partially transparent chips with LEDs on glass films above one another. Power is supplied to the layer planes provided for the different colors preferably by metal contacts which are combined with conductive tracks, for example, of ITO. Each pixel is located at the intersection of a column and a row of the arrangement, along which in each case extend transparent conductive tracks, which are arranged on the glass films of the stack or are embedded in the glass films. To illustrate this structure, FIG. 5 shows a perspective view of a carrier 5, on which are placed the conductive tracks 3 for row addressing. The respective LED chips are arranged on these conductive tracks, and the relevant terminal contact surface of each LED chip is electrically conductively connected with the associated conductive track 3.

Figure 6:
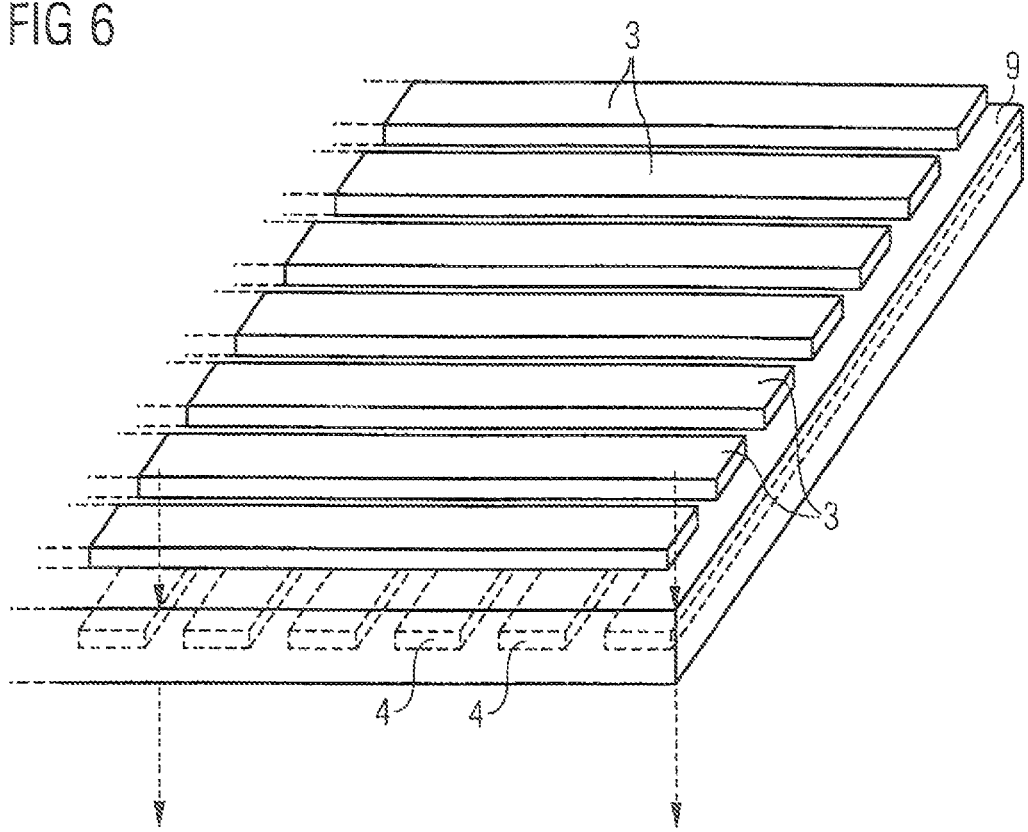
FIG. 6 shows a glass film with conductive tracks for row addressing and column addressing in a perspective view.

A glass film according to FIG. 6 is arranged over the LED chips on the conductive tracks of the carrier 5, the bottom of which glass film is provided with conductive tracks 4 for column addressing and the top of which is provided with further conductive tracks 3 for row addressing. The glass film 9, which is shown in FIG. 6 in a perspective view corresponding to FIG. 5, is arranged over the array of LED chips on the carrier 5, the broken arrows pointing downwards in FIGS. 5 and 6 being directed to points which here come to rest vertically above one another. These arrows thus reveal the relative orientation of the various planes of the arrangement. The conductive tracks 4 on the bottom for column addressing are electrically conductively connected with the relevant terminal contact surfaces of the LED chips on the carrier 5. Further LED chips are arranged on the further conductive tracks 3 for row addressing shown according to FIG. 6 on top of the glass film 9, which LED chips are provided, for example, with LEDs for a further color to be emitted. If a third color is additionally to be provided, a further glass film 9 according to FIG. 6 may be placed on top, the conductive tracks on the top of which are again provided with a further arrangement of LED chips.

Figure 7:
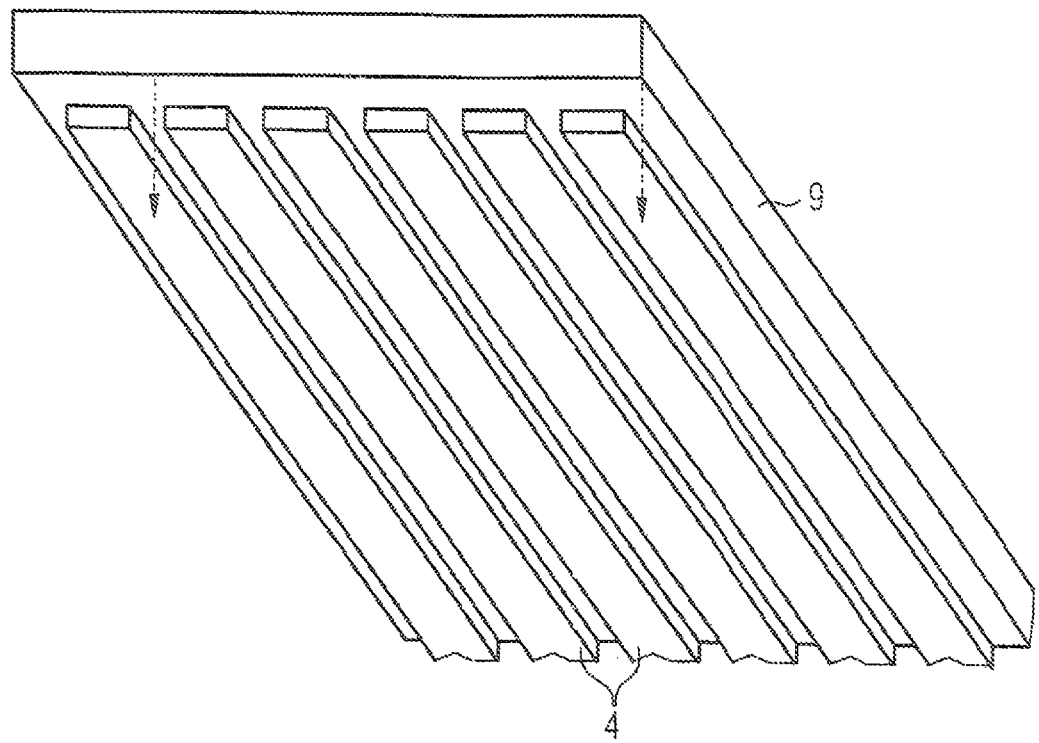
FIG. 7 shows a glass film with conductive tracks for column addressing in a perspective view from below.

FIG. 7 shows a perspective view from below of a further glass film 9, which is arranged topmost in the stack, specifically such that the points labelled with the downwards pointing broken arrows in FIG. 7 come to rest vertically above the points labelled in FIG. 6 with identical arrows, the points thus being aligned along the arrows. Due to the arrangement of the conductive tracks 4 for column addressing in the direction extending crosswise to the conductive tracks 3 for row addressing, it is possible, by selecting in each case one conductive track 3 for row addressing and one conductive track 4 for column addressing, to apply an electrical voltage to precisely one LED chip and so bring about light emission by the LED in question, while the unaddressed LEDs remain dark. By row- and column-wise addressing of the various planes, the desired color mixes can be generated in each pixel.

Figure 8:
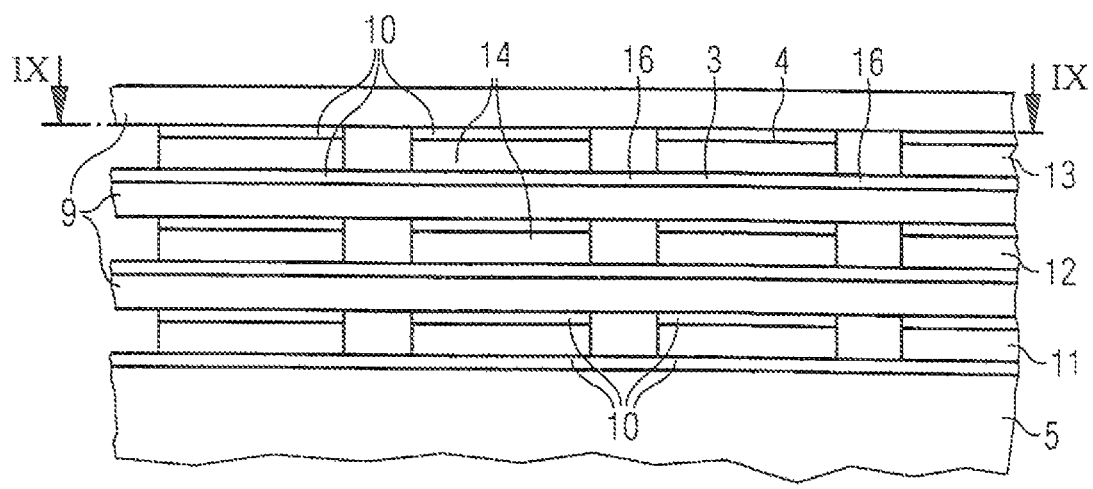
FIG. 8 shows a cross-section through a multi-planar arrangement of LED layers between transparent interlayers.

FIG. 8 shows a cross-section of a preferred example in which the electrical connection between the terminal contacts of the LEDs and the conductive tracks is in each case provided via metal frame contacts 10. The cross-section of FIG. 8 shows a plurality of planes of arrays of LED chips 14. On the carrier 5 is located a first LED layer 11 for a first color. A glass film 9 is located thereon, on which glass film is arranged a second LED layer 12 for a second color. A third LED layer 13 for a third color is arranged on a further glass film 9. This uppermost third LED layer 13 is covered on top with a glass film 9. Between the glass films and the LED chips are located thin conductive tracks, which may, for example, be configured in accordance with the representations in FIGS. 5, 6 and 7 and, due to their slight thickness, are not shown in FIG. 8. Metal frame contacts 10 are in each case provided between these conductive tracks and the electrical terminals of the LEDs. In the longitudinal direction of the conductive tracks, metallic connections are preferably present between the metal frame contacts 10, which connections may, for example, take the form of thin metal strips 16. In the cross-section of FIG. 8, the conductive tracks 3 (row addressing) extending in the plane of the drawing are in each case present on the bottom, facing the carrier 5, of the LED layer 11, 12, 13 in question, while the conductive tracks 4 (column addressing) extending crosswise thereto perpendicularly to the plane of the drawing are in each case present on the top, remote from the carrier 5, of the LED layer 11, 12, 13 in question. The conductive tracks 3, 4 are connected with the terminal contacts of the LEDs via the metal frame contacts 10. The metal frame contacts 10 may be connected with one another along the conductive tracks 3, 4 by metal strips 16. In the cross-section of FIG. 8, the metal strips 16 extending along the conductive tracks can only be seen in the lower conductive tracks 3 extending in the plane of the drawing. Corresponding metal strips may, however, also be provided for the upper conductive tracks 4 arranged on the respective tops of the LED chips and extend between the upper metal frame contacts 10 parallel to the upper conductive tracks 4 perpendicularly to the plane of the drawing. The metal frame contacts 10 on the tops of the LED chips are therefore separated from one another in the plane of the cross section of FIG. 8.

The LED layers 11, 12, 13 may be provided, for example, for red, green and blue light. It is alternatively also possible, for example, for the purpose of better color mixing, to provide at least one further LED layer of a suitable color or, for the purpose of monochrome reproduction, to provide just one single LED layer. The order in which the colors in the stack of LED layers and glass films is arranged is in principle as desired.

FIG. 9 shows the sectional view labelled in FIG. 8. FIG. 9 shows how the metal frame contacts 10 are arranged on the LED chips 14, which are separated from one another by narrow interspaces 15. In the plan view of FIG. 9, the conductive tracks 4 for column addressing extend from top to bottom. They are connected with the LED chips 14 via the metal frame contacts 10. Along the conductive tracks 4, the metal frame contacts 10 are connected with one another by metal strips 16. The conductive tracks 3 for row addressing present on the bottom of the LED chips 14 are concealed by the LED chips. The lower metal strips 16 are shown with dashed lines in FIG. 9, which extend in the same direction as the conductive tracks 3 for row addressing.

A projector, the pixels of which are in each case formed by LEDs, additionally permits the contrast of a generated image to be improved by connecting the LEDs which remain dark within the generated image as photodetectors. This is achieved by applying a voltage in the reverse direction to the pn-junction of the light-generating layer of the LED in question. In this mode of operation, electron-hole pairs generated by the incident light are electrically isolated from one another and yield a photocurrent. In this way, the LED absorbs incident light and is darker in appearance than an LED which is not operated in the reverse direction.

This disclosure is not restricted by the description given with reference to the examples. Rather, the disclosure encompasses any novel feature and any combination of features, including in particular any combination of features in the claims, even if this feature or this combination is not itself explicitly indicated in the claims or examples.

The invention claimed is:

1. An LED projector comprising:
   a carrier;
   a plurality of LED light sources of red, green and blue light arranged in a grid on the carrier; and
   an image generator which comprises an arrangement of pixels,
      each pixel comprising at least one light source;
   wherein 1) the LEDs are stacked epi-LEDs which comprise layers arranged above one another for different colors; 2) in the stacked epi-LEDs all the layers provided for light generation of the red, green and blue light are epitaxially grown directly above one another and form a single stack; and 3) electrical terminals and addressing conductive tracks that electrically address the LED light sources are arranged completely with the carrier.

2. The LED projector according to claim 1, further comprising:
   at least one LED layer provided with LEDs;
   a carrier or a transparent glass film with conductive tracks arranged under the LED layer;
   a transparent glass film with further conductive tracks arranged above the LED layer and crosswise to the conductive tracks; and
   the conductive tracks and the further conductive tracks are connected with terminal contacts of the LEDs such that each LED may be operated separately from the other LEDs via a conductive track and a further conductive track.

3. The LED projector according to claim 1, further comprising:
   a carrier of silicon on which the LEDs are arranged; and
   the carrier is provided with electrical conductors with which the LEDs may be operated independently of the other LEDs.

4. The LED projector according to claim 1, further comprising:
   metal frame contacts for the LEDs; and
   the LEDs are electrically connected via the metal frame contacts.

* * * * *